(12) United States Patent
Mukoyama et al.

(10) Patent No.: US 10,422,084 B2
(45) Date of Patent: *Sep. 24, 2019

(54) HYDROLYSABLE SHEET

(71) Applicant: DAIO PAPER CORPORATION, Ehime (JP)

(72) Inventors: Shinpei Mukoyama, Ehime (JP); Shinya Izumi, Ehime (JP); Asako Tanaka, Ehime (JP); Atsuko Hasezawa, Tochigi (JP)

(73) Assignee: DAIO PAPER CORPORATION, Ehime (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/576,750

(22) PCT Filed: Mar. 30, 2016

(86) PCT No.: PCT/JP2016/060500
§ 371 (c)(1),
(2) Date: Nov. 24, 2017

(87) PCT Pub. No.: WO2016/194459
PCT Pub. Date: Dec. 8, 2016

(65) Prior Publication Data
US 2019/0003128 A1    Jan. 3, 2019

(30) Foreign Application Priority Data

May 29, 2015  (JP) ................. 2015-110827
May 29, 2015  (JP) ................. 2015-110831

(51) Int. Cl.
| | | |
|---|---|---|
| *D21H 17/25* | (2006.01) | |
| *D21H 27/40* | (2006.01) | |
| *A47L 13/17* | (2006.01) | |
| *D21H 27/00* | (2006.01) | |
| *D21H 27/30* | (2006.01) | |
| *A47K 10/16* | (2006.01) | |
| *B31F 1/07* | (2006.01) | |
| *B32B 3/26* | (2006.01) | |
| *D21H 27/02* | (2006.01) | |
| *B32B 29/00* | (2006.01) | |
| *D21H 11/00* | (2006.01) | |
| *D21H 17/11* | (2006.01) | |
| *D21H 17/26* | (2006.01) | |
| *D21H 21/06* | (2006.01) | |
| *D21H 21/36* | (2006.01) | |
| *D21H 21/20* | (2006.01) | |
| *B32B 5/26* | (2006.01) | |
| *A47K 10/32* | (2006.01) | |

(52) U.S. Cl.
CPC ............ *D21H 27/40* (2013.01); *A47K 10/16* (2013.01); *A47L 13/17* (2013.01); *B31F 1/07* (2013.01); *B32B 3/263* (2013.01); *B32B 29/005* (2013.01); *D21H 11/00* (2013.01); *D21H 17/11* (2013.01); *D21H 17/26* (2013.01); *D21H 21/06* (2013.01); *D21H 21/20* (2013.01); *D21H 21/36* (2013.01); *D21H 27/00* (2013.01); *D21H 27/002* (2013.01); *D21H 27/02* (2013.01); *D21H 27/30* (2013.01); *A47K 2010/3266* (2013.01); *B31F 2201/0733* (2013.01); *B31F 2201/0738* (2013.01); *B31F 2201/0761* (2013.01); *B32B 5/26* (2013.01); *B32B 2307/7166* (2013.01); *B32B 2432/00* (2013.01); *D21H 17/25* (2013.01)

(58) Field of Classification Search
USPC .......................................................... 162/116
See application file for complete search history.

(56) References Cited

U.S. PATENT DOCUMENTS

| | | | |
|---|---|---|---|
| 5,281,306 A | 1/1994 | Kakiuchi et al. | |
| 6,054,020 A | 4/2000 | Goulet et al. | |
| 6,132,557 A | 10/2000 | Takeuchi et al. | |
| 6,228,218 B1 | 5/2001 | Takeuchi et al. | |
| 6,699,806 B1 | 3/2004 | Takeuchi et al. | |
| 2004/0118531 A1 | 6/2004 | Shannon et al. | |
| 2007/0128411 A1 | 6/2007 | Kawai et al. | |
| 2008/0076314 A1 | 3/2008 | Blanz et al. | |
| 2018/0098672 A1* | 4/2018 | Izumi ................ | A47K 10/16 |
| 2018/0146834 A1* | 5/2018 | Izumi ................ | A47L 13/17 |

FOREIGN PATENT DOCUMENTS

| | | |
|---|---|---|
| JP | H02-229295 | 9/1990 |
| JP | H03-193996 | 8/1991 |
| JP | H11-152696 | 6/1999 |
| JP | H11-187983 | 7/1999 |
| JP | 2001-172851 | 6/2001 |
| JP | 2003-183971 | 7/2003 |

(Continued)

OTHER PUBLICATIONS

JP 2011-30793, Wakita Yuya, machine translation, Feb. 2011.*
Japanese Office Action for 2015-121313 dated Jul. 31, 2017.
International Search Report for PCT/JP2016/060499 dated Jun. 28, 2016.
International Search Report for PCT/JP2016/060500 dated Jul. 5, 2016.
Japanese Office Action for 2015-121313 dated Oct. 13, 2017.
Japanese Office Action for 2015-110837 dated May 24, 2016.
Japanese Office Action for 2015-110837 dated Oct. 17, 2016.

(Continued)

*Primary Examiner* — Mark Halpern
(74) *Attorney, Agent, or Firm* — IPUSA, PLLC

(57) ABSTRACT

A toilet cleaning sheet 100 includes a multi-ply base paper sheet that is substantially water-dispersible. The multi-ply base paper sheet contains pulp and a water-soluble binder and is impregnated with an aqueous chemical agent. The basis weight of the multi-ply base paper sheet is 30 gsm to 150 gsm, and the content of the water-soluble binder increases towards a front surface and/or a back surface.

12 Claims, 8 Drawing Sheets

(56) References Cited

FOREIGN PATENT DOCUMENTS

| JP | 3865506 | 1/2007 |
| JP | 2007-154359 | 6/2007 |
| JP | 2007-209657 | 8/2007 |
| JP | 2008-094067 | 4/2008 |
| JP | 2011-030793 | 2/2011 |
| JP | 2012-106123 | 6/2012 |
| JP | 2013-237957 | 11/2013 |

OTHER PUBLICATIONS

Japanese Office Action for 2015-110839 dated May 24, 2016.
Japanese Office Action for 2015-110839 dated Oct. 17, 2016.
International Search Report for PCT/JP2016/060510 dated Jul. 5, 2016.
U.S. Office Action for U.S. Appl. No. 15/576,931 dated Jun. 27, 2019.

* cited by examiner

HYDROLYSABLE SHEET

This application is a 371 of PCT/JP2016/060500 filed 30 Mar. 2016

TECHNICAL FIELD

The present invention relates to a hydrolysable sheet.

BACKGROUND ART

Conventionally, reusable wiping cloths made of woven fabrics are used to clean toilets. Recently, however, disposable wet sheets made of paper are used instead. It is preferable that such a wet sheet is provided in a state of being impregnated with a cleaning agent, and can be disposed of by being flushed down a toilet after use. For the disposable wet sheet, the paper impregnated with a cleaning agent is required to be strong enough to resist tearing at the time of wiping, and hydrolyzability is required so as not to clog a pipe or the like when being flushed down a toilet. As a technique for effectively achieving these, it is known to use a water-disintegrable sheet, to which a water-soluble binder or the like containing carboxymethyl cellulose (CMC) is added, as base paper (for example, see Patent Document 1). toilet cleaning sheet

RELATED-ART DOCUMENTS

Patent Document

Patent Document 1: Japanese Examined Patent Publication No. 3865506

SUMMARY OF THE INVENTION

Problem to be Solved by the Invention

Here, for example, in a case where a wet sheet is used to clean a toilet, a conventional wet sheet may be torn when strongly rubbing an edge of a toilet bowl or the like. Hence, there is a problem to enhance a resistance to tearing during vigorous rubbing while ensuring sufficient hydrolyzability. Further, as a hydrolysable sheet impregnated with chemical solution (aqueous agent) containing a cleaning agent and the like, a hydrolysable sheet that has a higher sterilizing effect is desired.

In view of the above described problems, a first object of the present invention is to provide a hydrolysable sheet having an enhanced resistance to tearing during vigorous rubbing while ensuring sufficient hydrolyzability. Further, a second object of the present invention is to provide a hydrolysable sheet having an enhanced sterilizing effect.

Means to Solve the Problem

In order to solve the above described problem, a hydrolysable sheet of the invention recited in claim 1 includes a multi-ply base paper sheet that is substantially water-dispersible, the multi-ply base paper sheet containing pulp and a water-soluble binder and being impregnated with an aqueous chemical agent,
wherein a basis weight of the multi-ply base paper sheet is 30 gsm to 150 gsm, and
wherein a content of the water-soluble binder increases towards a front surface and/or a back surface.

The invention recited in claim 2, according to the invention recited in claim 1, is characterized in that embossments are formed on the hydrolysable sheet.

The invention recited in claim 3, according to the invention recited in claim 2, is characterized in that
first embossments and second embossments, arranged around the first embossments, are formed on an entire surface of the hydrolysable sheet, a shape of a protruding part of each of the second embossments differing from a shape of a protruding part of each of the first embossments.

The invention recited in claim 4, according to the invention recited in claim 3, is characterized in that
the first embossments are arrayed in a rhomboid grid.

The invention recited in claim 5, according to the invention recited in claim 3 or 4, is characterized in that
each of the second embossments is arrayed between two of the first embossments.

The invention recited in claim 6, according to the invention recited in any one of claims 3 to 5, is characterized in that
the first embossments and the second embossments are in contact to be a conjoined embossment.

The invention recited in claim 7, according to the invention recited in claim 2, is characterized in that
a grid-shaped embossed pattern is formed on the hydrolysable sheet such that convex portions and concave portions, obtained by inverting shapes of the convex portions, are alternately arranged in each of many lines, and convex portions and concave portions in adjacent lines are arrayed to be shifted with respect to each other by one-half pitch.

The invention recited in claim 8, according to the invention recited in any one of claims 1 to 7, is characterized in that
the hydrolysable sheet has a compounding ratio of softwood pulp to hardwood pulp less than 1/1.

The invention recited in claim 9, according to the invention recited in any one of claims 1 to 8, is characterized in that
the aqueous chemical agent includes a cross-linking agent that causes the water-soluble binder to initiate a cross-linking reaction and a sterilizing agent, and
with respect to a weight of the base paper sheet, the base paper sheet is impregnated with the aqueous chemical agent at 150% to 300% by weight.

The invention recited in claim 10, according to the invention recited in claim 9, is characterized in that
the sterilizing agent includes at least any one chemical of benzalkonium chloride, chlorhexidine gluconate, povidone iodine, ethanol, cetyl benzanium oxide, triclosan, chloroxylenol, and isopropylmethyl phenol.

Advantage of the Invention

According to the present invention, it is possible to provide a hydrolysable sheet having an enhanced resistance to tearing during vigorous rubbing while ensuring sufficient hydrolyzability. Further, it is possible to provide a hydrolysable sheet having an enhanced sterilizing effect.

MODE FOR CARRYING OUT THE INVENTION

In the following, a hydrolysable sheet that is an embodiment of the present invention will be described in detail with reference to the accompanying drawings. It should be noted that the scope of the invention is not limited to the illustrated examples.

It should be noted that for a hydrolysable sheet as the present invention, an example will be described in which the hydrolysable sheet is a toilet cleaning sheet 100. However, other than toilet cleaning sheets, a wet tissue impregnated with a chemical solution for cleaning/wiping is included as the hydrolysable sheet of the present invention. Further, a conveying direction of paper at the time of producing the toilet cleaning sheet 100 is described as the Y direction (longitudinal direction), and a direction perpendicular to the conveying direction is described as the X direction (lateral direction).

<Configuration of the Toilet Cleaning Sheet 100>

Figure 1:
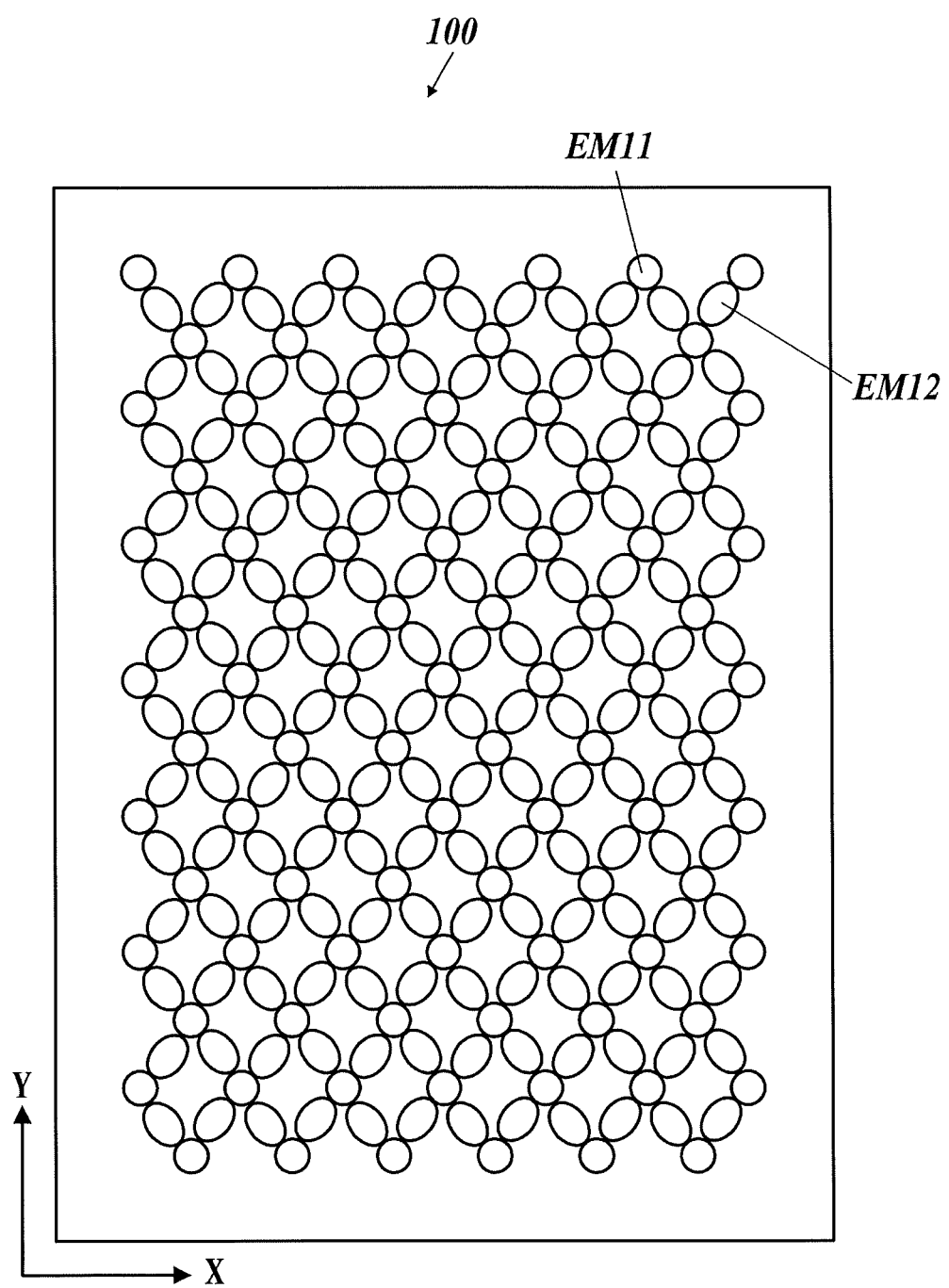
FIG. 1 is a plan view illustrating an example of a toilet cleaning sheet according to an embodiment.

First, a configuration of the toilet cleaning sheet 100 will be described. The toilet cleaning sheet 100 is obtained by applying a ply process to (obtained by stacking) a plurality of sheets (two sheets, for example) of base paper, and is impregnated with a predetermined chemical solution. Further, as illustrated in FIG. 1, an embossing process is applied to the entire sheet surface of the toilet cleaning sheet 100 to have two types of embossments EM11 and EM12. It should be noted that it is preferable that a contact area generated between an object to be cleaned up or the like and the two types of embossments EM11 and EM22 is preferably about 15 mm$^2$ to 30 mm$^2$ per 100 mm$^2$.

For example, unevenness of wiping can be reduced by arranging the embossments EM11 in rhomboid grids, in comparison with a case in which the embossments EM11 are arranged in square grids or rectangular grids. Further, the embossments EM12 are arranged between the embossments EM11.

Further, a folding process is applied to the toilet cleaning sheet 100 to fold it in two at the central portion in the Y direction. Then, the folded toilet cleaning sheet 100 is stored, within a plastic case, a packaging film, or the like for storage, and, at the time of being used, is unfolded as needed to be used. It should be noted that the manner of folding the toilet cleaning sheet 100 is not limited to folding it into two, but may be folding it into four or folding it into eight, for example.

Further, a base paper sheet of the toilet cleaning sheet 100 of the embodiment is composed of a hydrolysable fiber assembly such that after cleaning a toilet, the toilet cleaning sheet 100 can be discarded in the water tank of the toilet bowl.

A fiber obtained by mixing leaf bleached kraft pulp (LBKP) with needle bleached kraft pulp (NBKB) is used as the fiber assembly. A preferable material fiber has a compounding proportion of leaf bleached kraft pulp to components of the material fiber greater than 50% by weight. That is, a fiber of which a compounding ratio of needle bleached kraft pulp to leaf bleached kraft pulp is less than 1/1 is preferable. By increasing the compounding ratio of leaf bleached kraft pulp with respect to needle bleached kraft pulp, clearances between the fibers can be decreased and evaporation of water in the chemical solution can be suppressed. Further, the chemical solution is more easily retained in the fiber assembly, and a larger amount of the chemical solution is easily transferred, to an object to be wiped, by pushing the toilet cleaning sheet 100 at the time of wiping. Further, in order to enhance the strength of the base paper sheet serving as a base material of the toilet cleaning sheet 100, carboxymethyl cellulose (CMC) is applied, as a paper strength enhancing agent, to the base paper sheet. More specifically, CMC is applied such that a content of CMC increases from inside towards the front surface and the back surface in a thickness direction of the base paper sheet. Thereby, the toilet cleaning sheet 100 is less likely to be torn even when strongly rubbing an edge of a toilet bowl or the like relative to a conventional toilet cleaning sheet uniformly impregnated with a water-soluble binder.

Figure 2A:
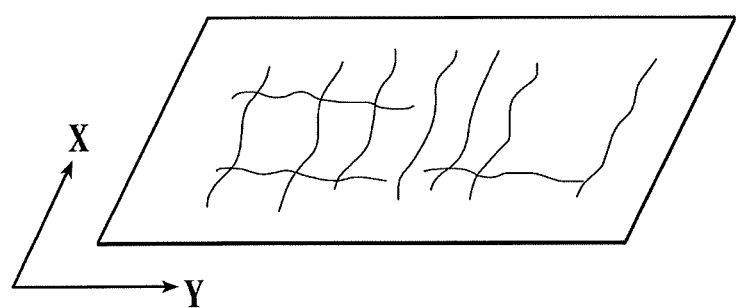
FIG. 2A is a diagram illustrating a fiber orientation of conventional paper.
Figure 2B:
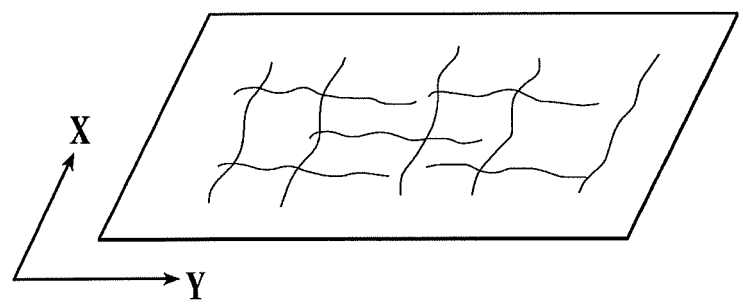
FIG. 2B is a diagram illustrating a fiber orientation of the present invention.

Further, a longitudinal/lateral ratio of a fiber orientation (longitudinal/lateral) of the toilet cleaning sheet 100 is preferably from 0.8 to 2.0 and is more preferably 1.0. Because fibers are placed on a wire of a papermaking machine in a papermaking process, which is a process of producing paper, to be conveyed in a conveying direction, in general, paper has characteristics in that many fibers are arranged in the longitudinal direction that is the conveying direction of the papermaking machine (for example, longitudinal:lateral=2.3:1, refer to FIG. 2A). That is, fiber density in the lateral direction is low and fibers are easily tear in the lateral direction. That is, fibers are easily tear depending on a wiping direction. Hence, according to the embodiment, as illustrated in FIG. 2B, the toilet cleaning sheet 100 has a longitudinal/lateral ratio of a fiber orientation of from 0.8 to 2.0, and 1.0 preferably. Thereby, it is possible to provide the toilet cleaning sheet 100 that is not easily torn even when being used to wipe in any direction. It should be noted that the longitudinal/lateral ratio of the fiber orientation can be obtained based on a ratio of wet strength in MD and CD directions.

Further, the toilet cleaning sheet 100 of the embodiment is impregnated with a predetermined chemical solution (aqueous chemical agent). Specifically, the predetermined chemical solution contains auxiliary agents such as a perfume, a preservative agent, a sterilizing agent, a paper strength enhancing agent, and an organic solvent, in addition to an aqueous cleaning agent. It is preferable that, with respect to a weight of the base paper sheet that is the base material of the toilet cleaning sheet 100, the base paper sheet is impregnated with the predetermined chemical solution at 150% to 300% by weight.

Any appropriate chemical solution may be used as the predetermined chemical solution. For example, in addition to a surfactant, a lower or higher (aliphatic) alcohol can be used as the aqueous cleaning agent. As the perfume, in addition to an aqueous perfume, one or several kinds can be selected from among oily perfumes such as orange oil. As the preservative agent, parabens such as methylparaben, ethylparaben, or propylparaben can be used, for example. As the sterilizing agent, benzalkonium chloride, chlorhexidine gluconate, povidone iodine, ethanol, cetyl benzanium oxide, triclosan, chloroxylenol, isopropylmethylphenol, or the like can be used, for example. As the paper strength enhancing agent (cross-linking agent), boric acid, various metal ions, or the like can be used. As the organic solvent, a polyhydric alcohol such as glycol (dihydric), glycerin (trihydric), or sorbitol (tetrahydric) can be used.

Further, the auxiliary agents of the components of the chemical solution described above can be appropriately selected and a component for satisfying another function may be contained in the chemical solution as needed.

Figure 3A:
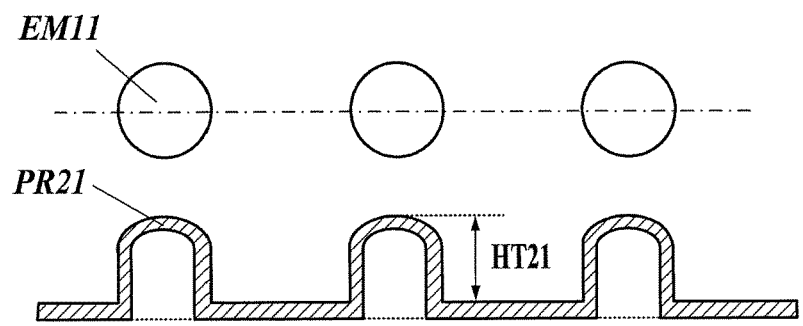
FIG. 3A is an enlarged view and a cross sectional view of an embossed part of the toilet cleaning sheet.

As illustrated in FIG. 3A, a protruding part PR21 of each embossment EM11 has a curved surface shape.

Figure 3B:
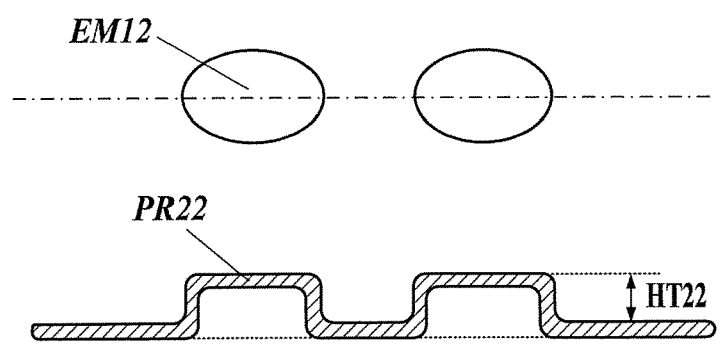
FIG. 3B is an enlarged view and a cross sectional view of an embossed part of the toilet cleaning sheet.

Further, as illustrated in FIG. 3B, a protruding part PR22 of each embossment EM12 has a planar shape.

Figure 3C:
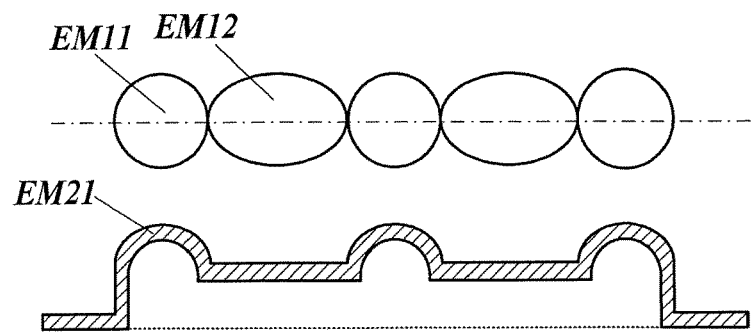
FIG. 3C is an enlarged view and a cross sectional view of an embossed part of the toilet cleaning sheet.

Because the embossments EM12 are arranged between the embossments EM11, the protruding parts PR21 of the embossments EM11 and the protruding parts PR22 of the EM12 are close to cohere, and thereby, a conjoined embossment EM 21 is formed as illustrated in FIG. 3C. Alternatively, the protruding parts PR21 of the embossments EM11 and the protruding parts PR22 of the embossments EM12 may be simply close to each other without being conjoined.

By the two types of embossments EM11 and EM12 formed in this manner, a contact area with an object to be cleaned or the like can be increased. Therefore, hardness of the toilet cleaning sheet 100 is eased and the wiping performance is enhanced.

That is, by forming in combination, on the entire sheet surface of the toilet cleaning sheet 100, the embossments EM11 each of which has the protruding part PR21 with the curved surface and the embossments EM12 each of which has the protruding part PR22 with the planar surface, the contact area is increased only after each embossment is deformed when force is applied to the toilet cleaning sheet 100 at the time of wiping. Thus, as well as increasing the contact area, flexibility is also enhanced as a result of the deformation of each embossment.

Figure 4A:
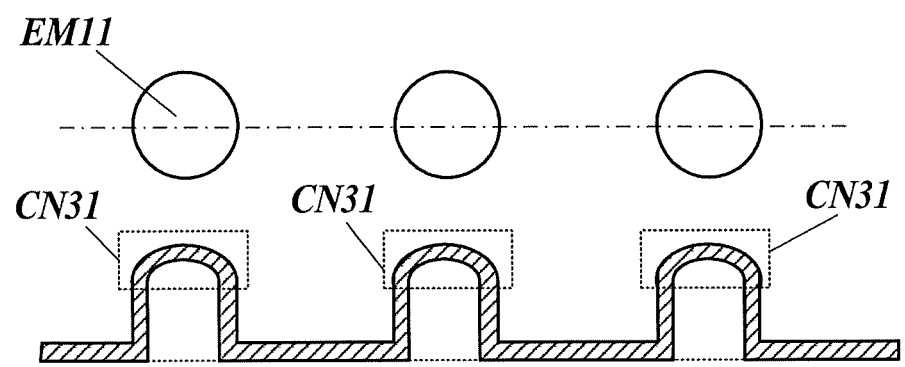
FIG. 4A is an explanatory diagram illustrating an example of contact areas of embossments.
Figure 4B:
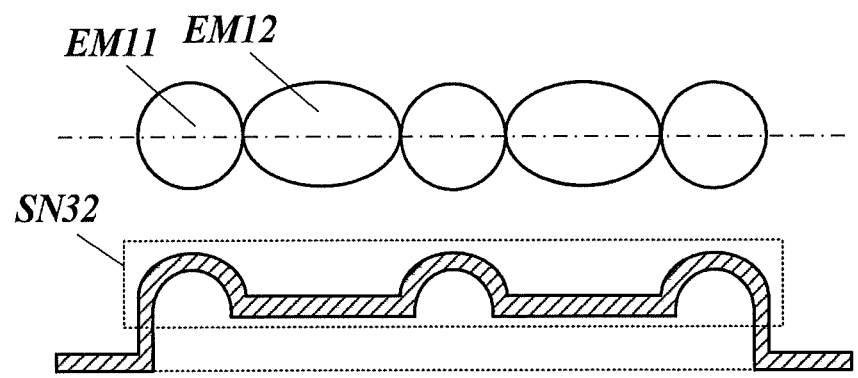
FIG. 4B is an explanatory diagram illustrating an example of a contact area of embossments.

For example, as illustrated in FIG. 4A, in a case where only the embossments EM11 are formed, contact areas CN31 generated by deformation of the embossments EM11 caused by force applied to the toilet cleaning sheet 100 at the time of wiping work discretely occur adjacent to the embossments EM11. On the other hand, in a case where the two types of embossments EM11 and EM12 are used in combination, as illustrated in FIG. 4B, a contact area CN32 generated by deformation of the embossments EM11 and EM12 caused by force applied to the toilet cleaning sheet 100 at the time of wiping work is increased in comparison with the contact areas CN31 of FIG. 4A.

Further, by the two types of embossments EM11 and EM12, effects of normal embossments can be similarly obtained, and texture, absorbability, bulkiness, and the like of the toilet cleaning sheet can be enhanced. Furthermore, by the conjoined embossment EM21, a good appearance effect based on applying the embossments can be obtained similar to normal embossments.

[Method of Producing the Toilet Cleaning Sheet 100]

Figure 5:
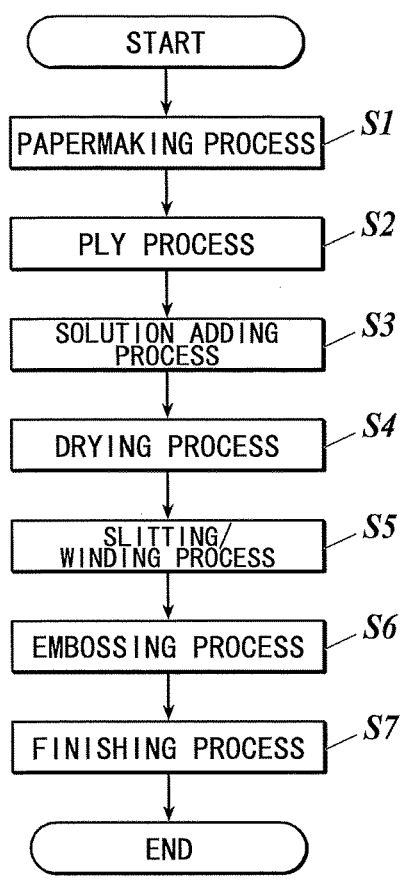
FIG. 5 is a flowchart illustrating a method of producing the toilet cleaning sheet according to the embodiment.
Figure 6:
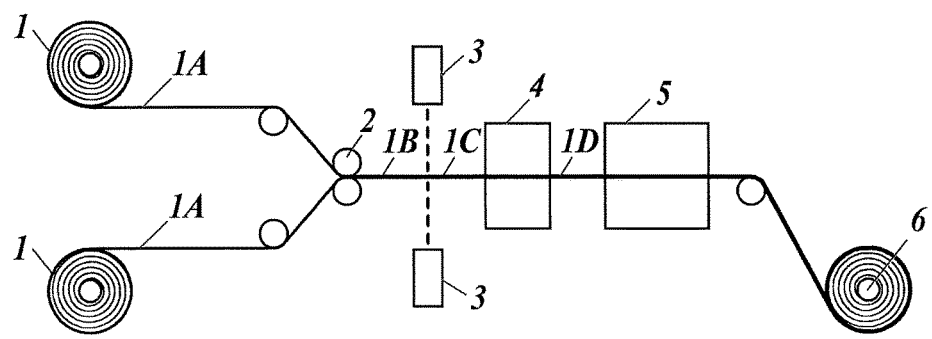
FIG. 6 is a schematic diagram illustrating an example of a producing facility (liquid solution adding facility) of the toilet cleaning sheet according to the embodiment.
Figure 7:
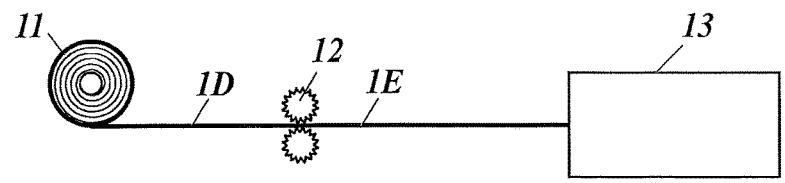
FIG. 7 is a schematic diagram illustrating an example of a producing facility (processing facility) of the toilet cleaning sheet according to the embodiment.

Next, a method of producing the toilet cleaning sheet 100 will be described. FIG. 5 is a flowchart illustrating the method of producing the toilet cleaning sheet 100. FIG. 6 is a schematic diagram of a liquid solution adding facility that adds, to the base paper sheet of the toilet cleaning sheet 100, a binder solution. FIG. 7 is a schematic diagram of a processing facility that processes the base paper sheet to which the binder solution has been added by the solution adding facility illustrated in FIG. 6.

In the method of producing the toilet cleaning sheet 100, as illustrated in FIG. 5, first, a papermaking process (S1) is performed by a papermaking machine (not illustrated) to prepare paper as base paper.

Next, as illustrated in FIG. 5 and FIG. 6, in the solution adding facility, a ply process (S2) to obtain a ply continuous sheet 1B is applied to continuous dry base paper 1A and 1A respectively fed from a plurality of (two, for example) primary web rollers 1 and 1, around which the prepared base paper is wound. A solution adding process (S3) is performed to add the binder solution to the ply continuous sheet 1B to obtain a continuous sheet 1G. A drying process (S4) is performed to dry the continuous sheet 1G. A slitting/winding process (S5) is performed to slit and wind the dried continuous hydrolysable sheet 1D. It should be noted that the number of primary web rollers may be changed as appropriate if the number is two or more. In the following description, an example will be described in which two rollers are used.

Next, as illustrated in FIG. 5 and FIG. 7, in the processing facility, an embossing process (S6) is performed to emboss the continuous hydrolysable sheet 1D, wound in the above described slitting/winding process (S5) and fed from a secondary web roller 11. A finishing process (S7) is performed to finish the embossed sheet 1E, to which the embossing process has been applied. Note that each of the processes will be described in detail later below.

(Papermaking Process)

First, the papermaking process according to the embodiment will be described. In the papermaking process (S1) of the present invention, for example, a papermaking material is used by a known wet type papermaking technique to form the base paper sheet. That is, after wetting the papermaking material, the material is dried by a dryer or the like to form the base paper sheet such as tissue paper or crepe paper. As a material of the base paper sheet, for example, known virgin pulp, recycled paper pulp, or the like may be used, and at least a pulp fiber is included. In particular, pulp obtained by mixing LBKP with NBKP in an appropriate proportion is suitable for the pulp to be the material. It should be noted that a rayon fiber, a synthetic fiber, or the like may be contained as a fiber other than the pulp fiber. Further, the base paper sheet of the present invention contains, as a flocculant, an anionic acrylamide-type polymer (referred to as the "anionic PAM" in the following). The anionic PAM is a polymer obtained by copolymerizing an acrylamide-type monomer and an anionic monomer. The acrylamide-type monomer is acrylamide alone, or a mixture of acrylamide and a nonionic monomer, as follows, copolymerizable with acrylamide. Examples of the nonionic monomer copolymerizable with acrylamide include methacrylamide, N,N-dimethylacrylamide, N,N-diethylacrylamide, N-isopropylacrylamide, N-isopropylacrylamide, N-hydroxyethylacrylamide, diacetone acrylamide, acryloylmorpholine, N-acryloylpyrrolidine, N-acryloylpiperidine, N-vinylrolidone, N-vinylformamide, and N-vinylacetamide. One of them may be used or two or more kinds may be used in combination. Examples of the anionic monomer include acrylic acid, methacrylic acid, acrylamide-2-methylpropanesulfonic acid, itaconic acid, maleic acid, fumaric acid, and neutralized salts thereof. It should be noted that a monomer such as styrene, acrylonitrile, or (meth) acrylic acid ester may be blended as long as it does not impair the water solubility of the anionic PAM. It is preferable that an additive amount of the anionic PAM is approximately 10 ppm to 1000 ppm. By using such an anionic flocculant having an electric charge that is the same as that of pulp to make paper, the flocculation of the base paper sheet can be decreased and the hydrolyzability can be enhanced by a capillary action. It should be noted that in addition to the flocculant and pulp described above, chemicals for papermaking such as a wet paper strength agent, an adhesive agent, and a remover may be used as appropriate in the base paper sheet.

According to the embodiment, in the paper making process, a longitudinal/lateral ratio of a fiber orientation (longitudinal/lateral) of the base paper sheet is adjusted to be 0.8 to 2.0 and more preferably to be 1.0. The fiber orientation can be adjusted, for example, by adjusting, in a papermaking machine, an angle at which papermaking material is supplied to the wire part. For example, the angle, at which the papermaking material is supplied, can be adjusted by adjusting a slice opening of a headbox. Alternatively, a vibration may be given in a direction perpendicular to the conveying direction by the papermaking machine (traveling direction) to adjust the fiber orientation.

(Continuous Dry Base Paper)

It is preferable that the continuous dry base paper 1A has, as a physical property, a basis weight approximately of from 15 gsm to 75 gsm. Further, a basis weight of the sheet (the continuous hydrolysable sheet 1D), containing the water-soluble binder, to which the ply process has been applied is approximately of from 30 gsm to 150 gsm. It should be noted that the basis weight is based on the standard of JIS P 8124. The continuous dry base paper 1A becomes, through the ply process (S2), the solution adding process (S3), the drying process (S4), and the slitting/winding process (S5) that are described later below, hydrolysable paper, to which the ply process has been applied, and the hydrolysable paper is processed into the toilet cleaning sheet 100 through the embossing process (S6), and the finishing process (S7) that are described later below.

(Ply Process)

Next, the ply process (S2) of the embodiment will be described. In the ply process (S2), as illustrated in FIG. 6, the ply process is applied to the respective continuous dry base paper 1A and 1A, continuously fed from the web rollers 1, along the continuous direction, and the continuous dry base paper 1A and 1A are supplied to an overlapping part 2 to make the ply continuous sheet 1B. The overlapping part 2 is composed of a pair of rollers and applies the ply process to the respective continuous base paper 1A and 1A to form the ply continuous sheet 1B, to which the ply process has been applied. Note that when the continuous dry base paper 1A and 1A are overlapped with each other, the continuous dry base paper 1A and 1A may be lightly fastened by pin embossments (contact embossments) so as not to misalign the continuous dry base paper 1A and 1A.

(Binder Solution)

Next, the binder solution will be described. The binder solution contains carboxymethyl cellulose (CMC) as a water-soluble binder. The concentration of carboxymethyl cellulose in the binder solution is 1% to 30% by weight. The concentration is preferably greater than or equal to 1% and less than 4% by weight.

A degree of etherification of CMC is preferably 0.6 to 2.0, is more preferably 0.9 to 1.8, and still more preferably 1.0 to 1.5. This develops excellent hydrolyzability and wet paper strength.

Further, water swellable material may be used as CMC. This enables, through cross-linking a specific metal ion in the chemical solution, to exert a function to keep an un-swelled fiber constituting the sheet and to impart strength as a wiping sheet to withstand cleaning/wiping work.

A component other than carboxymethyl cellulose included in the binder solution is a binder component such as polyvinyl alcohol, starch or a derivative thereof, hydroxypropyl cellulose, sodium alginate, tranth gum, guar gum, xanthan gum, gum arabic, carrageenan, galactomannan, gelatin, casein, albumin, purplan, poly ethylene oxide, viscose, polyvinyl ethyl ether, sodium polyacrylate, sodium polymethacrylate, polyacrylamide, a hydroxylated derivative of polyacrylic acid, or a polyvinyl pyrrolidone/vinyl pyrrolidone vinyl acetate copolymer.

It is preferable to use a water-soluble binder including a carboxyl group in terms of having suitable hydrolyzability and developing wet strength by a cross-linking reaction. The water-soluble binder including the carboxyl group is an anionic water-soluble binder that easily generates a carboxylate within water. An example of the binder is a polysaccharide derivative, a synthetic macromolecule, or a natural product. The polysaccharide derivative may be a salt of carboxymethyl cellulose, carboxyethyl cellulose or a salt thereof, carboxymethylated starch or a salt thereof. In particular, an alkali metal salt of carboxymethyl cellulose is preferable.

The synthetic macromolecule may be a salt of a polymer or a copolymer of unsaturated carboxylic acids, a salt of a copolymer of an unsaturated carboxylic acid and a monomer copolymerizable with the unsaturated carboxylic acid, or the like. The unsaturated carboxylic acid may be acrylic acid, methacrylic acid, itaconic acid, crotonic acid, maleic anhydride, maleic acid, fumaric acid or the like. The monomer copolymerizable with these unsaturated carboxylic acids may be an ester of these unsaturated carboxylic acids, vinyl acetate, ethylene, acrylamide, vinyl ether, or the like. As the synthetic macromolecule, a macromolecule that uses acrylic acid or methacrylic acid as an unsaturated carboxylic acid is particularly preferable. Specifically, polyacrylic acid, polymethacrylic acid, a salt of a copolymer of acrylic acid and methacrylic acid, or a salt of a copolymer of acrylic acid or methacrylic acid and alkyl acrylate or alkyl methacrylate is particularly preferable. The natural product may be sodium alginate, xanthan gum, gellan gum, tragacanth gum, pectin or the like.

(Solution Adding Process)

Next, the solution adding process (S3) of the embodiment will be described. In the solution adding process (S3), as illustrated in FIG. 6, the above descried binder solution is sprayed from respective two-fluid-type spray nozzles 3 and 3 on both external surfaces of the ply continuous sheet 1B (surfaces for which the continuous dry base paper 1A and 1A do not face each other at the time of applying the ply process to the continuous dry base paper 1A and 1A). In this way, the water-soluble binder included in the binder solution can be added to the ply continuous sheet 1B. It should be noted that as a method of spraying the binder solution, for example, immediately after the respective two-fluid-type spray nozzles spray the above described binder solution to the external surfaces of sheets of the respective continuous dry base paper 1A and 1A fed from the above described primary web rollers 1 and 1 (to surfaces that the respective sheets do not face), a ply process may be applied to the continuous dry base paper 1A and 1A so as to generate a sheet equivalent to the above described continuous sheet 1G.

Each of the two-fluid-type spray nozzles 3 is a type of a spray nozzle that mixes and sprays liquid and compressed air divided into two systems, and is able to finely and uniformly spray liquid relative to a single-fluid-type spray nozzle that singly sprays compressed liquid. In a case where two-fluid-type spray nozzles are used in the embodiment, because the two-fluid-type spray nozzles apply, at a high pressure (spraying pressure that is higher than or equal to 1.5 MPa), the binder solution (having viscosity of 400 MPa·s to 1200 MPa·s) to each of the external surfaces of the ply continuous sheet 1B to which the ply process has been applied, the binder solution is easily added in the thickness direction of the sheet. In contrast, in a case where single-fluid-type spray nozzles are used in the embodiment, the single-fluid-type spray nozzles apply, at a spraying pressure lower than or equal to 1.5 MPa, the binder solution (having viscosity of 400 MPa·s to 1200 MPa·s) to each of the external surfaces of the ply continuous sheet 1B to which the ply process has been applied, whereby the binder solution is easily added in the thickness direction of the sheet, and the binder solution is uniformly applied to the sheet surfaces. In this way, by spraying the binder solution on the external surface(s) of the ply continuous sheet 1B, the toilet cleaning sheet 100 becomes in a state in which a content of the water-soluble binder increases, from the center in the thickness direction (when applying to both surfaces) or from the surface to which the binder solution is not applied (when applying to one surface), towards the surface(s) to which the binder solution is applied. Therefore, it is possible to produce the toilet cleaning sheet 100, having enhanced surface strength, and that is not easily damaged even when being used in vigorous rubbing, while ensuring sufficient hydrolysablity.

(Drying Process)

Next, the drying process (S4) of the embodiment will be described. In the drying process (S4), as illustrated in FIG. 6, insoluble liquid components in the binder solution of the continuous sheet 10 described above are evaporated by the drying facility 4 to fix active components, CMC in particular, to the fiber. Here, because the impregnation amount of the binder solution decreases towards inside from the external surface(s) of the continuous sheet 10 in the thickness direction, the fixation amount of CMC decreases towards inside in the thickness direction. Hence, when the chemical solution is added in the finishing process (S7) that will be described later below, towards inside in the thickness direction, a cross-linking reaction is less likely to occur and voids increase, and therefore the chemical solution can be trapped inside the sheet. Thereby, it is possible to obtain the toilet cleaning sheet 100 that does not easily dry. Further, because a large amount of cross-linking reactions of CMC occur in the vicinities of the external surface(s) of the continuous sheet 10, it is possible to increase the surface strength of the obtained toilet cleaning sheet 100. As the drying facility 4, a dryer facility with a hood that supplies hot air to the continuous sheet 10 to dry the continuous sheet 10 can be used. It should be noted that, in order to cause the sheets to more firmly adhere to each other, pressing rollers or turning rollers may be installed and then the continuous sheet 10 is passed through the pressing rollers or the turning rollers before the drying process (S4).

Further, as the drying facility described above, a facility that emits an infrared ray may be used. In this case, a plurality of infrared ray emitting parts are arranged in parallel in the conveying direction of the above described continuous sheet 1C, and infrared rays are emitted to the conveyed continuous sheet 1C to dry the sheet 1C. Because water is heated and dried by the infrared rays, the sheet can be uniformly dried and generation of wrinkles in the subsequent slitting/winding process can be prevented relative to a dryer using hot air.

(Slitting/Winding Process)

Next, the slitting/winding process (S5) of the embodiment will be described. In the slitting/winding process (S5), in order to obtain a web for when the continuous hydrolysable sheet 1D, to which the ply process has been applied, is processed by an off-line processing machine, while tension of the continuous hydrolysable sheet 1D, dried in the above described drying process (S4) and to which CMC has been fixed, is adjusted, the sheet is slit by a slitter 5 at a predetermined width and wound in a winder facility 6. A winding speed is appropriately determined in consideration of the ply process (S2), the solution adding process (S3), and the drying process (S4). It should be noted that if the winding speed is too fast, the sheet may break, and if the winding speed is too slow, the sheet may wrinkle. In the slitting/winding process (S5), the continuous hydrolysable sheet 1D, to which the ply process has been applied, is pressure-joined such that the continuous hydrolysable sheet 1D is further unified to be a single sheet.

(Embossing Process)

Next, the embossing process (S6) of the embodiment will be described. In the embossing process (S6), as illustrated in FIG. 7, the continuous hydrolysable sheet 1D, fed from the secondary web roller 11, is embossed by embossing rollers 12 to form predetermined shapes on the entire sheet surface. The sheet is embossed in order to enhance design quality as well as to enhance strength, bulkiness, wiping performance, and the like of the sheet.

(Finishing Process)

Next, the finishing process (S7) of the embodiment will be described. In the finishing process (S7), as illustrated in FIG. 7, a series of processes, which include a process of cutting the embossed sheet 1E, a process of folding the respective cut sheets, impregnating the respective folded sheets with the above described chemical solution, and packaging the respective sheets impregnated with the above described chemical solution, are performed in a finishing facility 13. Here, it is preferable to use a polyvalent metal ion in the cross-linking agent included in the chemical solution, in a case where CMC is used as the water-soluble binder. In particular, it is preferable to use one kind or two or more kinds of polyvalent metal ions selected from among the group consisting of alkaline earth metals, manganese, zinc, cobalt, and nickel, in terms of sufficiently bonding the fibers to develop strength for withstanding use and of having sufficient hydrolyzability. It is particularly preferable to use ions of calcium, strontium, barium, zinc, cobalt, and nickel among these metal ions. As described above, through the respective processes, the toilet cleaning sheet 100 is produced.

PRACTICAL EXAMPLE

Next, results of evaluating damage for when a toilet cleaning sheet (practical example) of the embodiment to which CMC was applied from the outside was used in vigorous rubbing and of evaluating damage a conventional toilet cleaning sheet (comparative example) uniformly impregnated with CMC was used in vigorous rubbing will be described with reference to table 1.

<Application Conditions>

Practical Example

Material of base paper: pulp 100%
Basis weight: 45 g/m$^2$
Ply number: two-ply
Water-soluble binder and its content: CMC 1.2 g/m$^2$ (Spray application)
Components of chemical solution: surfactant, sterilizing agent, perfume, glycol ether, etc.
Embossing process: not applied Comparative Example Material of base paper: pulp 100%
Basis weight: 45 g/m$^2$
Ply number: two-ply
Water-soluble binder and its content: CMC 1.2 g/m$^2$ (uniform impregnation)
Components of chemical solution: surfactant, sterilizing agent, perfume, glycol ether, etc.
Embossing process: applied <Test Method>

Each toilet cleaning sheet was folded into three and a measured portion was rubbed by a fastness rubbing tester to measure the number of rubs at which point damage such as tearing or fuzzing was visually identified on the paper surface. It should be noted that the test conditions by the fastness rubbing tester were as follows.

Pendulum: PP band (Sekisui Jushi Corporation, part number 15.5K)
Load: 200 gf
Speed is 30 cpm (30 round-trips per minute) and stroke is 120 mm

TABLE 1

| PRACTICAL EXAMPLE | | | | COMPARATIVE EXAMPLE | |
|---|---|---|---|---|---|
| CMC-APPLIED SURFACE | | CMC-NON-APPLIED SURFACE | | | |
| MD | CD | MD | CD | FRONT · MD | BACK · MD |
| 140 | 180 | 12 | 20 | 32 | 31 |

As illustrated by the results in the table 1, it was found that the surface to which CMC was applied in the practical example has greater surface strength than that of the comparative example, and damage such as tearing and fuzzing for when being used in vigorous rubbing was extremely less likely to occur in the surface, to which CMC was applied in the practical example. That is, according to the embodiment, it was found that a hydrolysable sheet, in which the content of a water-soluble binder is increased towards the front surface and/or the back surface by applying a solution containing the water-soluble binder to either or both of the external surfaces of a base paper sheet, has hydrolysablity securely and is less likely to be torn even when being used in vigorous rubbing.

Next, results of evaluating sterilizing effects of hydrolysable sheets (toilet cleaning sheets) of the embodiment will be described with reference to table 2.

<Application Conditions>

In the practical examples 1 and 2, the toilet cleaning sheets 100, produced by the above described production method, were used to evaluate sterilizing effects based on the following evaluation method.

Basis weight of base paper sheet (practical examples 1 and 2): 90 gsm (45 gsm×2)

Impregnation rate of chemical solution (practical examples 1 and 2): 200% by weight with respect to the weight of base paper sheet Components of chemical solution (practical example 1): propylene glycol 3%, propylene glycol monomethyl ether 13%, benzalkonium chloride 0.2%, zinc sulfate 1%, surfactant, perfume, preservative, etc. 0.7%, water 82.1%

Components of chemical solution (practical example 2): propylene glycol 5%, propylene glycol monomethyl ether 10%, benzalkonium chloride 0.2%, zinc sulfate 1%, surfactant, perfume, preservative, etc. 0.7%, water 83.1%

Embossed pattern (practical examples 1 and 2): pattern illustrated in FIG. 9 and FIG. 11 and paragraph 0084, which will be described later below Conversely, in a comparative example, CMC was added in a papermaking process such that CMC distributed uniformly in a thickness direction of the prepared base paper. Then, a two-ply sheet of the base paper, to which the CMC was added, was made by the above described ply process. Subsequently, a toilet cleaning sheet, produced through a drying process, a slitting/winding process, an embossing process, and a finishing process in a way similar to the above described examples, was used to evaluate sterilizing effects based on the following evaluation method.

Basis weight of base paper sheet (comparative example): 90 gsm (45 gsm×2)

Impregnation rate (comparative example): 200% by weight with respect to the weight of base paper sheet Components of chemical solution (comparative example): propylene glycol 5%, propylene glycol monomethyl ether 10%, benzalkonium chloride 0.2%, zinc sulfate 1%, surfactant, perfume, antiseptic and others 0.7%, water 83.1%

Embossed pattern (comparative example): pattern illustrated in FIG. 9 and FIG. 11 and paragraph 0084, which will be described later below <Evaluation Method>

According to the testing method of sterilizing performance of wet wipes (established on Apr. 1, 2015 supervising editor: Kourai, Hiroki, professor emeritus at Tokushima University), sterilizing effects of the respective toilet cleaning sheets of the above described practical examples 1 and 2 and comparative example were evaluated. Note that the overall judgement was "VERY GOOD" when both sterilizing rates of *Escherichia coli* and *Staphylococcus aureus* were higher than or equal to 99.99% (sterilization values were higher or equal to 4), the overall judgement was "GOOD" when both the sterilizing rates were higher than or equal to 99.9% (sterilization values were higher or equal to 3), the overall judgement was "FAIR" when both the sterilizing rates were higher than or equal to 99% (sterilization values were higher or equal to 2), and the overall judgement was "POOR" when both the sterilizing rates were less than 99% (sterilization values were less than 2).

TABLE 2

|  | | PRACTICAL EXAMPLE 1 | PRACTICAL EXAMPLE 2 | COMPARATIVE EXAMPLE |
|---|---|---|---|---|
| STERILIZING ACTIVITY VALUE | ESCHERICHIA COLI | >4.1 | >4.4 | >4.1 |
|  | STAPHYLOCOCCUS AUREUS | 3.9 | >4.2 | 2.5 |
| TOTAL JUDGEMENT | | GOOD | VERY GOOD | FAIR |

As illustrated by the results in the table 2, while the overall judgement of the sterilizing effects of the comparative example was "FAIR", the overall judgement of the sterilizing effects of the practical example 1 was "GOOD", and the overall judgement of the sterilizing effects of the practical example 2 was "VERY GOOD". It was confirmed that the sterilizing effects of the practical examples 1 and 2 were enhanced relative to the comparative example.

As described above, according to the embodiment, a state is made in which the content of CMC increases from inside towards the front surface and back surface in the thickness direction of the base paper sheet, which is the base material of the toilet cleaning sheet 100. Thereby, when the base paper sheet is impregnated with the chemical solution, a large amount of the chemical solution can be trapped inside the base paper sheet. Accordingly, by applying a pressure to the toilet cleaning sheet 100 at the time of wiping work, a large amount of the chemical solution containing the sterilizing agent is discharged to a target object. Thereby, bacteria attached to the target object can be preferably killed and removed, and the effect of sterilizing the target object can be enhanced.

Specific descriptions have been provided above based on the embodiment of the present invention, but the present invention is not limited to the above described embodiment, and may be modified without departing from the scope of the invention. In the described embodiment of the present invention, an example is illustrated in which each of the embossments EM11 has the curved-shaped protruding part PR 21 and each of the embossments EM12 has the planar-shaped protruding part PR22, but the embossments are not necessarily limited to these shapes. For example, protruding parts of the embossments EM11 and the embossments EM12 may have planar shapes of differing heights. Alternatively, for example, each embossment EM11 may have a planar-shaped protruding part, and each embossment EM12 may have a curved-shaped protruding part.

In other words, a protruding part of each embossment may have any shape as long as two types of embossments (which are first embossments and second embossments) have protruding parts of different shapes and the second embossments are arranged around the first embossments.

Further, in the described embodiment of the present invention, the embossments EM12, each of which has the planar protruding part, are arranged between the embossments EM11, each of which has the curved surface protruding part, but the embossments EM11 may intersect with each other.

Further, in the described embodiment of the present invention, all the embossments EM11 and EM12 protrude towards the near side with respect to the drawing of FIG. 1, but embossments EM11 and EM12 having a convex shape towards the near side with respect to the drawing and embossments EM11 and EM12 having a concave shape towards the near side with respect to the drawing may be alternately arranged.

Figure 8:
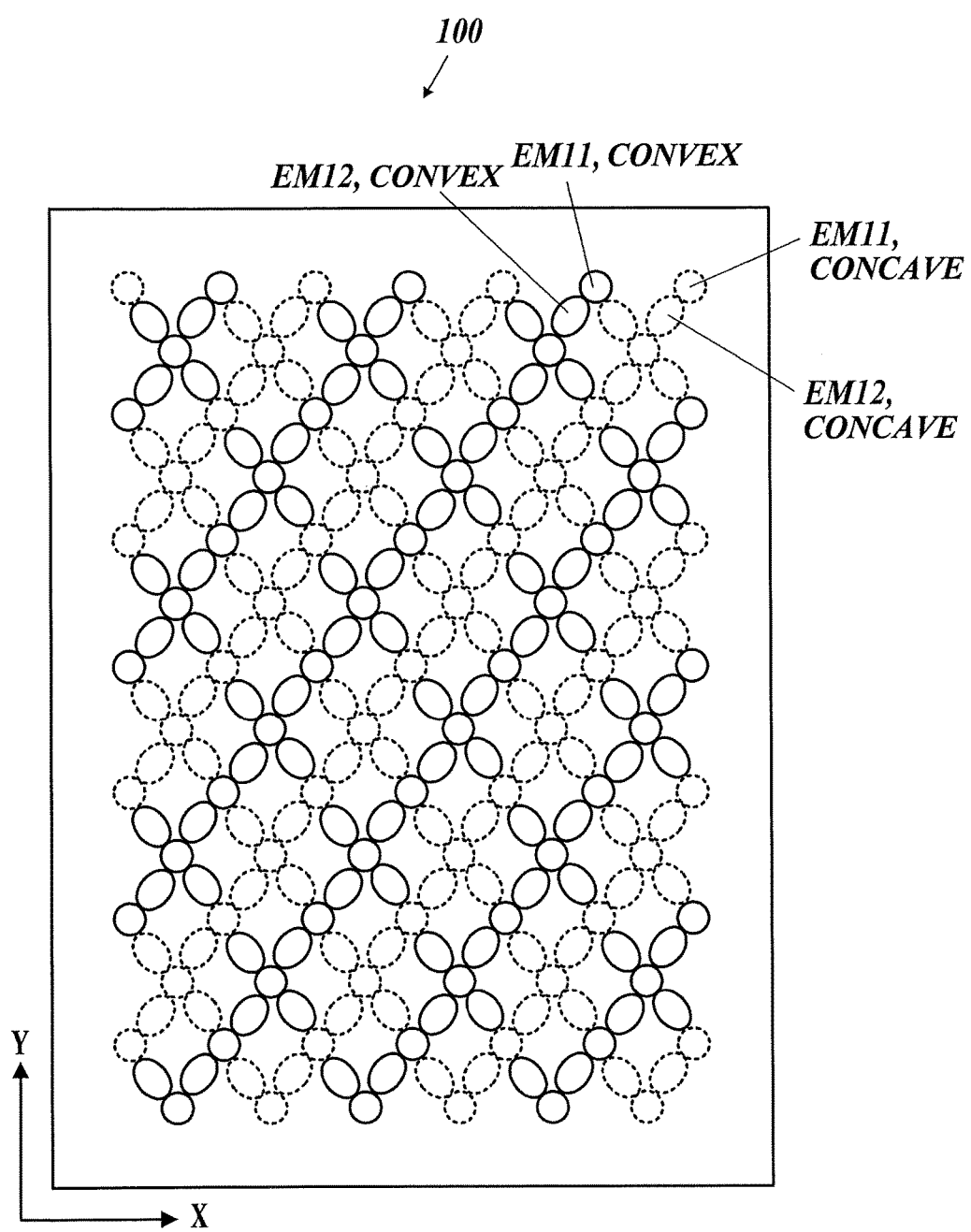
FIG. 8 is a plan view illustrating another example of a toilet cleaning sheet according to the embodiment.

For example, as illustrated in FIG. 8, embossments EM11 and EM12 (portions illustrated by solid lines), each of which has a convex shape towards the near side with respect to the drawing of FIG. 8, and embossments EM11 and EM12 (portions illustrated by dashed lines), each of which has a concave shape with respect to the near side of the drawing of FIG. 8, may be alternately arranged to provide a hydrolysable sheet that has high wiping performance for both surfaces of the toilet cleaning sheet 100 as well as enhancing surface strength of the hydrolysable sheet by being embossed.

Further, in the described embodiment of the present invention, the protruding parts PR21 of the embossments EM11 and the protruding parts PR22 of the EM12 are close to cohere to be formed as the conjoined embossment EM21. However, the protruding parts PR21 of the embossments EM11 and the protruding parts PR22 of the EM12 may be simply close to each other without cohering.

Further, in the described embodiment of the present invention, an example is illustrated in which each embossment EM11 has a circular shape or an elliptical shape, but the shape of each embossment may be any shape, such as a rectangular shape or a polygonal shape.

Further, it is preferable that heights HT21 and HT22 of the protruding parts of the embossment EM11 and EM12 in FIG. 3 are 0.40 mm to 0.75 mm, for example. It should be noted that the surfaces are three-dimensionally measured by a digital microscope made by KEYENCE Co. to measure the heights of the protruding parts of the embossments, for example.

For example, when the heights are less than 0.40 mm, friction at the time of wiping becomes stronger and the wiping becomes difficult. When the heights exceed 0.75 mm, the shapes of the embossments EM11 and EM12 becomes easily deformed at the time of being packaged, and the appearance becomes worse.

Further, an embossed pattern of toilet cleaning sheets are not limited to the above described pattern. FIG. 9 is a plan view of a toilet cleaning sheet 101 obtained by changing only the embossed pattern of the toilet cleaning sheet 100. FIG. 10 is an enlarged view of part A-A of FIG. 9. FIG. 11A is a cut end view taken through B-B of FIG. 10. FIG. 11B is a cut end view taken through C-C of FIG. 10.

Figure 9:
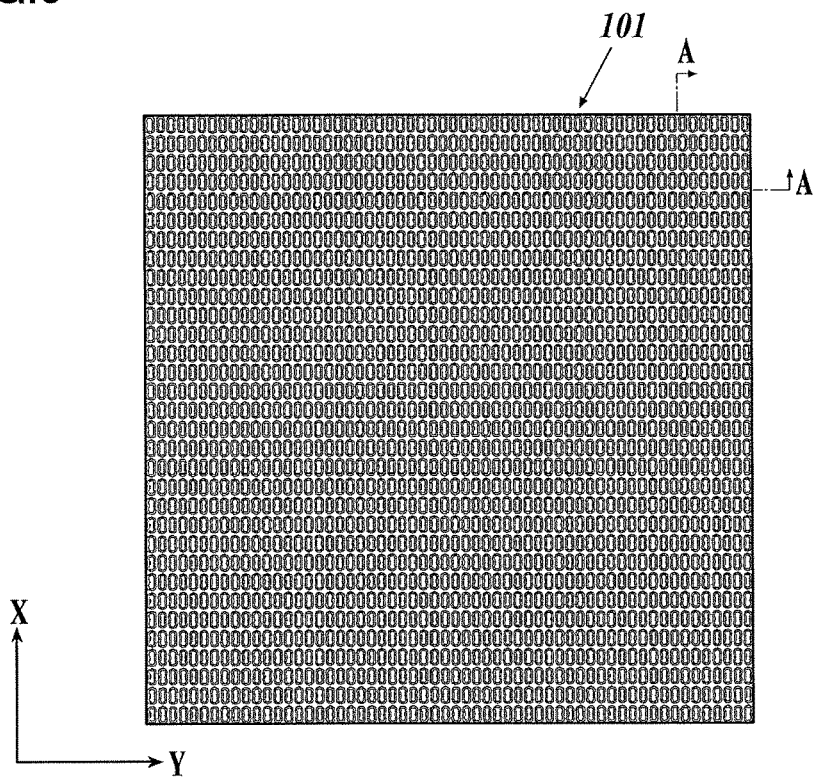
FIG. 9 is a plan view illustrating another example of a toilet cleaning sheet according to the embodiment.
Figure 10:
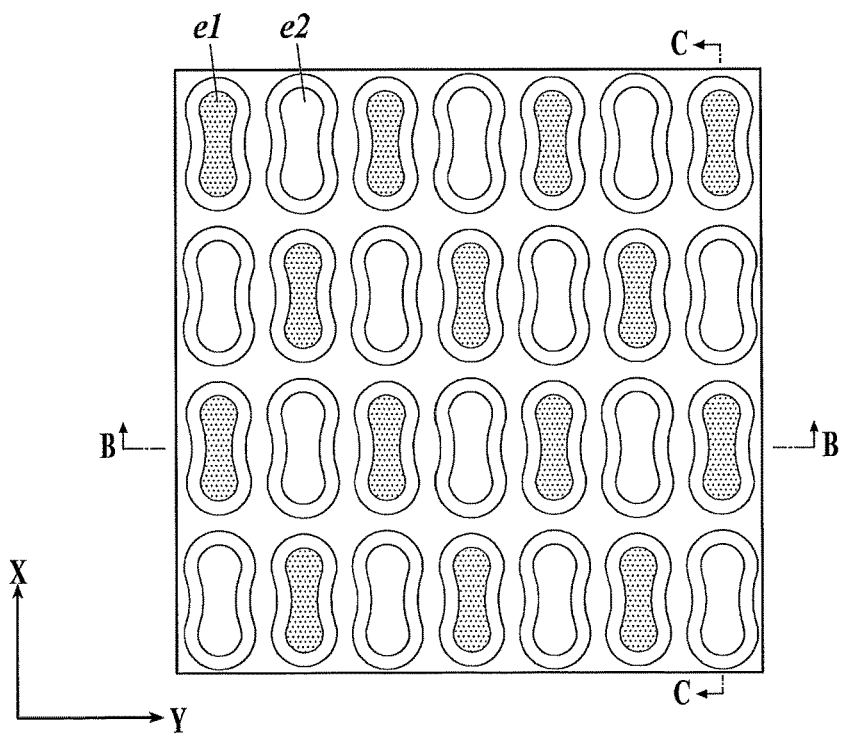
FIG. 10 is an enlarged view of part A-A of FIG. 9.
Figure 11A:
FIG. 11A is a cut end view taken through B-B of FIG. 10.
Figure 11B:
FIG. 11B is a cut end view taken through C-C of FIG. 10.

In FIGS. 9 to 11, concave portions e2 have shapes obtained by inverting convex portions e1. An embossed pattern is formed such that the convex portions e1 and the concave portions e2 are alternately arranged in each of many lines and the convex portions e1 and the concave portions e2 in the adjacent lines are arrayed to be shifted with respect to each other by one-half pitch. In this way, by alternately forming the convex portions e1 and the concave portions e2 in both the longitudinal direction and the lateral direction, wiping performance of dirt can be enhanced relative to an embossed pattern in which convex portions are arranged in one line and convex portions are arranged in one line. It should be noted that the shapes of the convex portions e1 and the concave portions e2 are not particularly limited, and shapes such as circular shapes, elliptic shapes, and polygonal shapes may also be used. These shapes may be combined.

In addition, a detailed configuration of the toilet cleaning sheet 1 may be modified as appropriate without deviating from the scope of the present invention.

INDUSTRIAL APPLICABILITY

The present invention is preferably applicable to a field of producing a hydrolysable sheet.

DESCRIPTION OF REFERENCE SYMBOLS

100, 101 toilet cleaning sheet
1 primary web roller
1A continuous dry base paper
1B ply continuous sheet
1C continuous sheet
1D continuous hydrolysable sheet
1E embossed sheet
2 overlapping part
3 spray nozzle
4 first drying facility
5 slitter
6 winder facility
11 secondary web roller
12 embossing roller
13 finishing facility
EM11 embossment
EM12 embossment
EM13 embossment
PR21 protruding part
PR22 protruding part

The invention claimed is:

1. A hydrolysable sheet comprising a multi-ply base paper sheet that is substantially water-dispersible, the multi-ply base paper sheet containing pulp and a water-soluble binder sprayed on a front surface and/or a back surface of the hydrolysable sheet and being impregnated with an aqueous chemical agent, wherein
 a basis weight of the multi-ply base paper sheet is 30 gsm to 150 gsm, and
 a content of the water-soluble binder sprayed on the front surface and/or the back surface increases towards the front surface and/or the back surface.

2. The hydrolysable sheet according to claim 1, wherein protruding parts are formed on the hydrolysable sheet.

3. The hydrolysable sheet according to claim 2, wherein first protruding parts and second protruding parts, arranged around the first protruding parts, are formed on an entire surface of the hydrolysable sheet, a shape of each of the second protruding parts differing from a shape of each of the first protruding parts.

4. The hydrolysable sheet according to claim 3, wherein the first protruding parts are arrayed in a rhomboid grid.

5. The hydrolysable sheet according to claim 3, wherein each of the second protruding parts is arrayed between two of the first protruding parts.

6. The hydrolysable sheet according to claim 3, wherein the first protruding parts contact the second protruding parts to form a conjoined embossment.

7. The hydrolysable sheet according to claim 2, wherein a grid-shaped pattern is formed on the hydrolysable sheet such that convex portions and concave portions, obtained by inverting shapes of the convex portions, are alternately arranged in each of many lines, and convex portions and concave portions in adjacent lines are arrayed to be shifted with respect to each other by one-half pitch.

8. The hydrolysable sheet according to claim 1, wherein the hydrolysable sheet has a compounding ratio of softwood pulp to hardwood pulp less than 1/1.

9. The hydrolysable sheet according to claim 1, wherein
 the aqueous chemical agent includes a cross-linking agent that causes the water-soluble binder to initiate a cross-linking reaction and a sterilizing agent, and
 with respect to a weight of the base paper sheet, the base paper sheet is impregnated with the aqueous chemical agent at 150% to 300% by weight.

10. The hydrolysable sheet according to claim 9, wherein the sterilizing agent includes at least any one chemical of benzalkonium chloride, chlorhexidine gluconate, povidone iodine, ethanol, cetyl benzanium oxide, triclosan, chloroxylenol, and isopropylmethyl phenol.

11. The hydrolysable sheet according to claim 1, wherein first protruding parts and second protruding parts are formed on the hydrolysable sheet, a height of the first protruding parts differing from a height of the second protruding parts in a thickness direction of the hydrolysable sheet.

12. The hydrolysable sheet according to claim 11, wherein the height of the first protruding parts and the height of the second protruding parts are greater than or equal to 0.40 mm and less than or equal to 0.75 mm.

\* \* \* \* \*